US006378553B1

(12) United States Patent
Cannet

(10) Patent No.: US 6,378,553 B1
(45) Date of Patent: Apr. 30, 2002

(54) BUILT-IN MANOMETER FOR A DEVICE FOR THE DISTRIBUTION OF FLUID UNDER PRESSURE, PARTICULARLY FOR A GAS EXPANDER

(75) Inventor: Gilles Cannet, Parmain (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/420,562

(22) Filed: Oct. 19, 1999

(30) Foreign Application Priority Data

Oct. 19, 1998 (FR) ........................................... 98 13069

(51) Int. Cl.[7] ............................................... F16K 37/00

(52) U.S. Cl. ......................... 137/552; 137/557; 73/756; 285/124.4; 285/305

(58) Field of Search ................................ 137/552, 557; 73/756; 285/124.4, 124.5, 305

(56) References Cited

U.S. PATENT DOCUMENTS

| | | | | | |
|---|---|---|---|---|---|
| 1,797,591 | A | * | 3/1931 | Sartakoff | 137/557 |
| 2,618,978 | A | * | 11/1952 | Ragland | 73/756 |
| 3,107,498 | A | | 10/1963 | Messer | |
| 3,603,154 | A | * | 9/1971 | Frantz | 73/756 |
| 3,759,553 | A | * | 9/1973 | Carter | 285/305 X |
| 3,760,842 | A | * | 9/1973 | Mikiya | 137/557 |
| 4,749,192 | A | * | 6/1988 | Howeth | 285/305 X |
| 4,867,487 | A | * | 9/1989 | Phillis | 285/305 |
| 5,104,156 | A | * | 4/1992 | Carlson | 285/305 |
| 5,150,926 | A | * | 9/1992 | Egli | 285/305 X |
| 5,152,318 | A | * | 10/1992 | Ortner et al. | 137/557 |
| 5,152,499 | A | * | 10/1992 | Silverman et al. | 285/305 X |
| 5,758,909 | A | * | 6/1998 | Dole et al. | 285/305 |
| 5,779,283 | A | * | 7/1998 | Kimura et al. | 285/305 |

FOREIGN PATENT DOCUMENTS

| | | |
|---|---|---|
| DE | 32 43 811 | 5/1984 |
| GB | 2 111 154 | 6/1983 |

* cited by examiner

*Primary Examiner*—John Rivell
(74) *Attorney, Agent, or Firm*—Young & Thompson

(57) ABSTRACT

The invention relates to a device (1) for distributing fluid under pressure, particularly welding gas, comprising at least one body (1') provided with at least one manometer (3, 3') comprising a housing (4) and a connection ferrule (2, 2'), said connection ferrule (2, 2') being inserted in a recess (5, 5') provided in the body (1'), characterized in that said body (1') comprises moreover at least one passage (6, 16) communicating with said recess (5, 51), and in that said connection ferrule (2, 2') comprises at least one recess (7, 71) and in that at least one connection means (8, 18) is inserted in at least one portion of at least one passage (6, 16) of the body (1') and in at least one portion of at-least one recess (7, 7') of the connection ferrule (2, 21), so as to permit the solidarization, at least temporarily, of said manometer (3, 3') on said body (1').

Cylinder of welding gas or of medical gas provided with such a device for fluid distribution.

11 Claims, 5 Drawing Sheets

BUILT-IN MANOMETER FOR A DEVICE FOR THE DISTRIBUTION OF FLUID UNDER PRESSURE, PARTICULARLY FOR A GAS EXPANDER

FIELD OF THE INVENTION

The present invention relates to a device for the distribution of a fluid under pressure, such as an expander for gas under pressure, provided with one or several built-in manometers, usable particularly in the field of welding or medicine.

BACKGROUND OF THE INVENTION

Conventionally, to indicate the pressure of a fluid, it is usual to use a manometer. Thus, manometers adapted to be mounted on expanders for gas or other fluids to indicate the pressure of said gas or fluid, for example before and after expansion, are conventionally fixed on the expander by means of a screwed connection, also called a connecting ferrule, as set forth in the standard EN562.

So as to be able to ensure on the one hand the sealing between the expander and the manometer and, on the other hand, the. correct positioning or indexing of the manometer, so as to be able to read the indication which it gives, it is also conventional to provide between the end of the screw thread carried by the connection ferrule and the bottom of the tapped recess of the manometer body, adapted to receive said ferrule, a deformable ring constituted for example of aluminum or plastic material.

During the operation of mounting the manometer on the body of the expander, said manometer is first screwed with a torque sufficient to ensure sealing, then with a supplemental torque adapted to deform the above-mentioned ring, so as to reach the required angular position to read it, which is to say to index said manometer.

An analogous technique comprises the use of a conical screw-threaded ferrule provided with a film of deformable material, for example a strip of TEFLON or of tow.

According to still another technique, it is possible to secure the manometer on the expander by means of screw-threaded nozzle or, as the case may be, by compression of a flat joint with the aid of a floating nut.

However, these different ways of securement have a certain number of drawbacks.

Thus, the technique of the deformable ring, which is in widespread use, has at least four major drawbacks, in particular these:

- it implies the transmission of a relatively great torque to the connecting ferrule of the manometer and hence requires arranging between the screw-threaded portion of the connecting ferrule and the housing of the manometer, a portion of square or hexagonal cross-section to which will be applied the gripping torque by means of a flat key or similar gripping device, which moreover implies providing a sufficient space between the lower end of the housing of the manometer and the upper surface of the body of the expander to permit the passage of said gripping key, during mounting or unmounting of the manometer on the expander. Such requirements therefore limit the possibility of designing new expanders, in particular when it is desired to decrease their size and to increase their mechanical efficiency. Moreover, this type of mounting gives rise to increase of cost of mounting and/or unmounting the manometer.

- it requires the use of deformable materials, such as aluminum or plastic, which are incompatible with certain gases, such as for example oxygen.
- it poses problems of sealing under extreme temperature conditions because of the expansion of the assembly, flow or modification of the mechanical characteristics of the ring, for example during temperature variations from −40° C. to +60° C.
- it requires delicate maintenance, particularly upon dismounting, because it is generally difficult to remove the ring after deformation.

Moreover, the solution consisting in using a tapped nozzle permits fixing the manometer on the expander without requiring a screwing operation or the like, as used in expanders of the MONOBLOC 3 type sold by LA SOUDURE AUTOGENE FRANCAISE.

However, this solution cannot be considered as ideal, to the extent that it requires, on the one hand, that the manometer be held during its mounting and on the other hand that access be provided to the rear of the body supporting the manometer so as to be able to mount the tapped nozzle, which limits the possibilities of design of new expanders.

The object of the present invention is thus to provide a solution to the above-mentioned problems, whilst improving the safety and mechanical efficiency of the expanders.

SUMMARY OF THE INVENTION

The present invention thus relates to a device for the distribution of fluid under pressure, such as an expander of fluid under pressure, comprising at least one body provided with at least one manometer comprising a housing and a connection ferrule, said connection ferrule being inserted in a recess provided in the body, characterized in that:

- said body moreover comprises at least one passage communicating with said recess,
- said connection ferrule comprises at least one recess, and
- at least one connection means is inserted in at least one portion of at least one passage of the body and in at least one portion of at least one recess of the connection ferrule, so as to permit the securement, at least temporarily, of said manometer on said body.

As the case may be, the device for distributing fluid under pressure according to the invention comprises one or several of the following characteristics:

- at least one recess is provided in the lateral peripheral wall of the connection ferrule;
- the connection ferrule comprises several recesses, in that the body comprises several passages communicating laterally with said recess, and in that at least one connection means is inserted in at least one portion of at least one of the passages and in at least one portion of at least one of the recesses;
- the connection ferrule moreover comprises at least one sealing means, preferably one or several O-rings;
- the sealing means is arranged between at least one recess and the distal end of the connection ferrule and/or in that the sealing means is inserted in a circular peripheral throat provided in the lateral peripheral wall of the connection ferrule;
- the connection means is of elongated shape, preferably, and is chosen from keys, pins, rods, screws, cotters or other similar means;
- the latter peripheral wall of the connection ferrule is free from screw-threading and/or the peripheral wall of the recess is free from tapping;

at least one supply passage for fluid under pressure opens through an opening in the bottom of the recess of the body;

at least one supplemental passage establishes communication between the recess and the atmosphere and opens through the side wall of the recess;

at least one supplemental recess, comprising control means for the circulation of fluid under pressure entering the recess through the opening, is provided in the body between the bottom of said recess and the supply passage;

it is chosen from expanders for fluid under pressure, particularly expanders or valve/expander ensembles for gas under pressure.

The invention moreover relates to a manometer adapted to be provided for a device according to the invention, said manometer comprising a housing and a connection ferrule, characterized in that said connection ferrule comprises at least one recess provided in its peripheral side wall.

Preferably, the connection ferrule of the manometer moreover comprises at least one circular peripheral throat adapted to receive a sealing means, such as an O-ring, said circular peripheral throat being arranged between at least one recess and the distal end of the ferrule.

The invention also relates to an expander for fluid under pressure comprising at least one body and at least one recess provided in the body and adapted to receive at least one portion of a connection ferrule of a manometer, characterized in that said body comprises at least one passage communicating laterally with said recess.

Moreover, the invention also relates to a cylinder of fluid under pressure provided with a fluid distribution device, in particular an expander, such as those mentioned above.

BRIEF DESCRIPTION OF THE DRAWINGS

The invention will now be described in greater detail with the help of the accompanying figures given by way of illustration but not limitation.

FIGS. 1 and 2 are identical, except that the manometer of FIG. 1 is of the radial connection ferrule 2 type (as seen face on), whilst the manometer of FIG. 2 is of the axial connection ferrule 2 type (seen in profile).

Figure 5A:
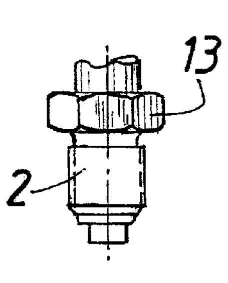
Figure 5B:
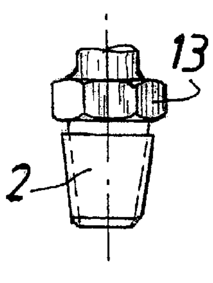

Moreover, the connection ferrule 2 is generally of cylindrical shape as shown in FIG. 5*a*, but can, in certain cases, have a different shape, for example a conical shape as shown in FIG. 5*b*.

Generally speaking, the graduations of the markings on the dial 12 of the manometer 3 must be contrasting and readable, which is to say it must be possible easily to read the pressures that they indicate. To do that, it is customary that the background of the dial be white in color and that the needle and the markings be black. Moreover, the graduation scale is generally numbered each ten units of graduation with a minimum of four numbers on the dial. The point of the needle 11 customarily ends as close as possible to the dial 12, which is to say at a distance of at most equal to 2 mm, so as to permit effective reading of the pressure by the operator.

Figure 6:
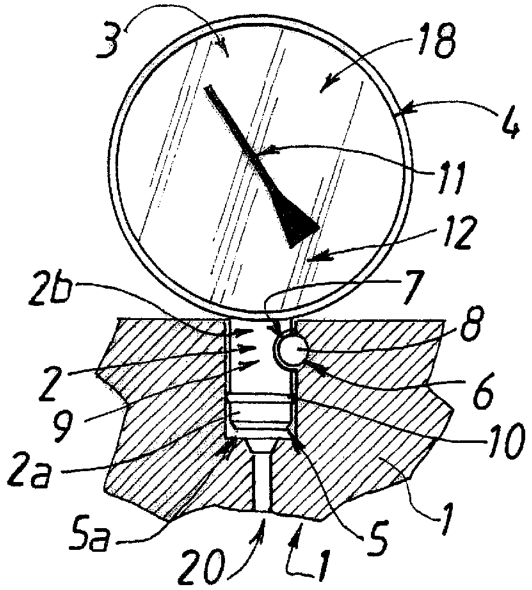

FIG. 6 shows a manometer 3 with a needle 11 according to the present invention, comprising, here again a housing 4 provided with a dial 12 provided with graduations (not shown), said housing 4 being provided with a connection ferrule 2, which is inserted in a recess 5 provided in the body 1' of a device for distribution of fluid under pressure, here a gas expander (seen in partial cross-section).

More precisely, the manometer 3 of FIG. 6 is of the radial connection type and comprises a connection ferrule 2 of cylindrical shape without screw threading. Similarly, the recess 5 of the body is also free from tapping.

The connection ferrule 2 comprises a recess 7 provided in its side peripheral wall 9 and adapted to receive a connection means 8, such as a key or a similar means, as given in more detail hereafter.

Moreover, a passage 6 communicating with the recess has been provided in the body 1' of the expander, so that the connection means 8, once inserted in the passage 6 of the body 1' and in the recess 7 of the connection ferrule 2, permits the securement, at least temporarily, of the manometer 2 on the body 1', which is to say which permits holding the manometer 3 in position on the body 1'.

Sealing means, such as an O-ring, are carried by the distal end 2*a* of the connection ferrule 2, so as to avoid or to limit loss of fluid under pressure via the space existing between the side wall 9 of the ferrule 2 and the side wall of the recess 5, thereby to ensure a precise indication of the pressure of the fluid under pressure by the manometer 3.

In a manner known per se, the fluid under pressure is brought to the manometer 3 by a passage 20 of fluid under pressure itself also disposed in the body 1' of the expander 1 and opening at the inner end of the recess 5.

Contrary to the passage 20 for fluid supply under pressure, the passage 6 communicates with, not the lower end of the recess 5, but with the peripheral wall of said recess 5, which is in contact with the side peripheral wall 9 of the connection ferrule 2.

Figure 7A:
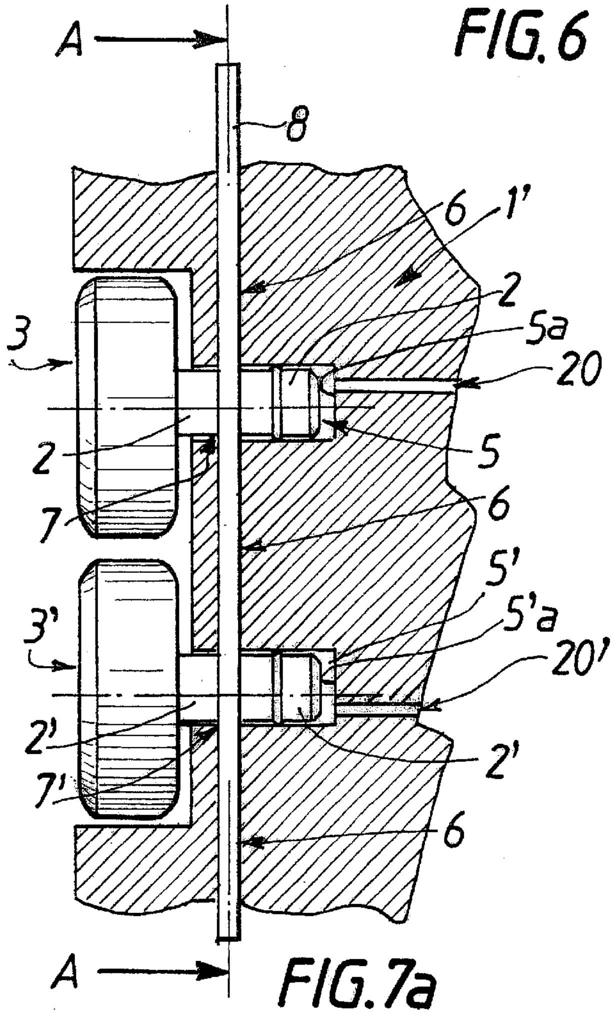
Figure 7B:
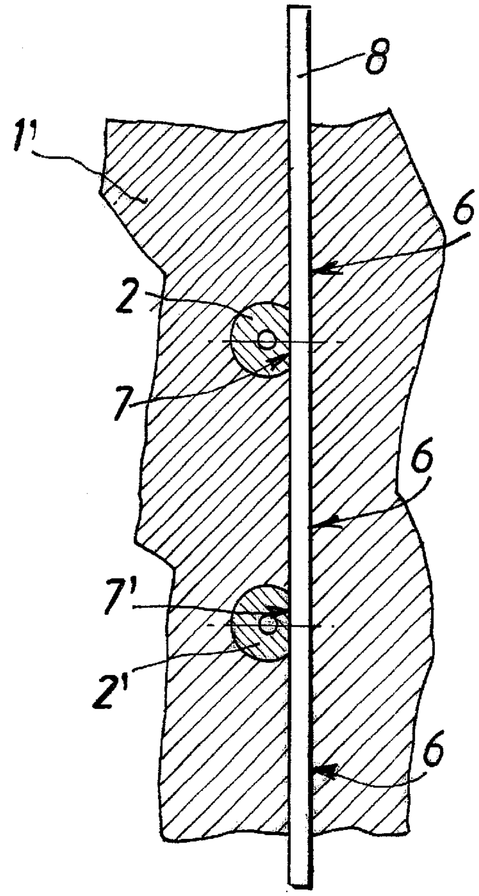

FIGS. 7*a* and 7*b* show schematically two manometers 3, of the axial connection type, according to the present invention, which are held and fixed in the same body 1' of a distribution device 1 for fluid under pressure by means of a single and same securement means 8, inserted on the one hand in the passage 6 of the body 1', and, on the other hand, in the recesses 7 and 7' of the connection ferrules 2 and 2' of the manometers 3 and 3', respectively, according to the same principle as that given for FIG. 6.

The manometers 3 and 3' are supplied, in a conventional manner, with fluid under pressure by the passages 20 and 20' for fluid supply under pressure.

Here again, the connection ferrules 2 and 2' of the manometers 3 and 3', respectively, are free from any screw threading and the recesses 5 and 5' of the body 1', in which are inserted the ferrules 2 and 2', are themselves also free from any tapping. In other words, the securement of the manometers 3 and 3' on the body 1' is carried out by coaction of the connection means 8, for example a key, a pin or the like, with the recesses 7 and 7'. This is shown in FIG. 7*b*, which represents a cross-section on FIG. 7*a* along the line AA.

The securement means 8 can be, as the case may be, a key, a pin, a staple, a screw or the like, or a combination of several of these elements.

Moreover, although the manometers 3 and 3' of FIG. 7 are maintained by the same securement means 8, it is possible to give to each of the manometers 3 and 3' a securement means individual to itself.

Moreover, as the case may be, the securement means 8 can be hidden or embedded in the body 1' of the device 1 for distribution of fluid, particularly when disassembling the manometer is not desirable for reasons of safety, for example, or on the contrary the securement means can be easily accessed, particularly when regular and frequent maintenance is necessary.

It will be understood from FIGS. 6, 7*a* and 7*b* that, according to the solution proposed by the present invention, the sealing is effected by means for example of an O-ring ensuring great flexibility of positioning of the manometer in its recess and efficacious indexing of the latter, that the securement and the indexing properly so-called are ensured by the securement means 8 which moreover comprise an obstacle to displacement, that is to say withdrawal, of the manometer 3 from its recess 5 in the body 1' of the expander. However, in certain cases, it is possible to ensure the indexing by a different means than the key 8.

Figure 1:
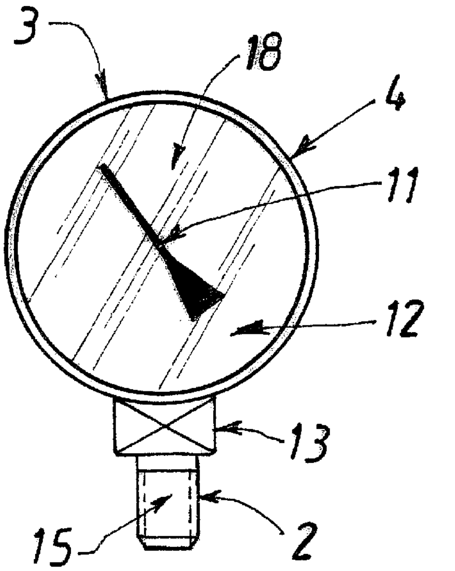
FIGS. 1 and 2 show a manometer adapted to be provided for an expander for fluid under pressure according to the prior art and as described for example in European Standard EN562. More precisely, this manometer 3 comprises a housing 4 enclosing all the mechanisms of the manometer, a graduated dial 12, a needle 11 for indicating pressure, a protective cover 18 of glass or transparent polymer, grippable member 13 and a connection ferrule 2 comprising a screw threading 15. The connection ferrule 2 is adapted to be inserted by screwing of a screw-threaded part 15 into a tapped recess provided in the expander on which it is to be mounted. The gripping and indexing of the manometer on the expander take place by means of the grippable member 13 and a gripping key transmitting to said gripping member 13 the gripping torque necessary for the correct securement of the manometer on the expander.
Figure 2:
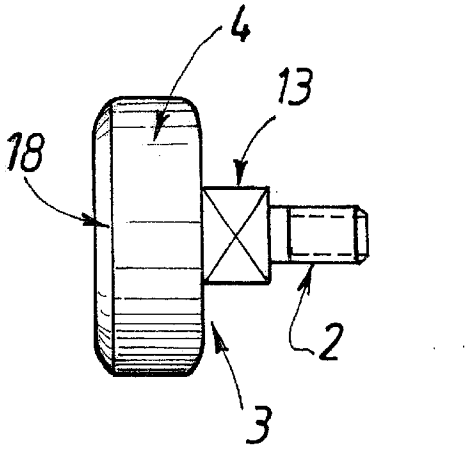
Figure 4A:
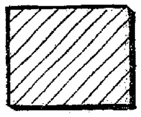
Figure 4B:
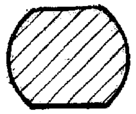
Figure 3:
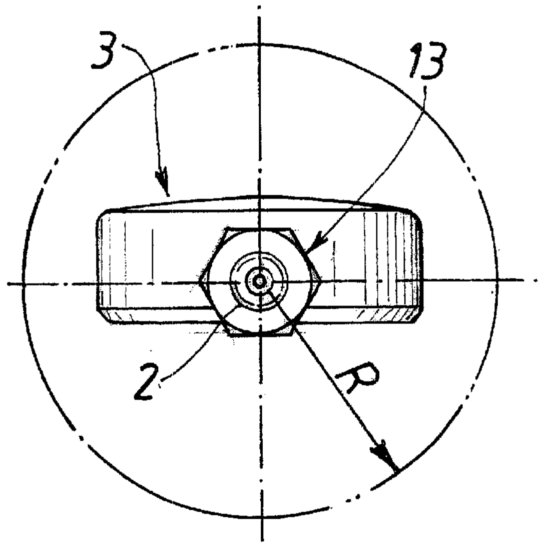
FIG. 3 shows a manometer identical to that of FIG. 1 seen from below, in which it is clearly seen that the gripping member 13 of the manometer 3 has a hexagonal shape. However, the gripping member 13 could also have other shapes, for example a rectangular square shape, as shown in FIG. 4*a* or a truncated cylindrical shape as shown in FIG. 4*b*.

In any case, the solution proposed by the invention permits avoiding the need for screwing encountered with the manometers of the prior art and permits omitting the gripping member 13, as shown in FIG. 1, and avoiding the need to machine screw threading on the connection ferrule 2 of the manometer 3, and, in a similar way, tapping in the walls 5 of the recess of the body 1'.

Figure 8:
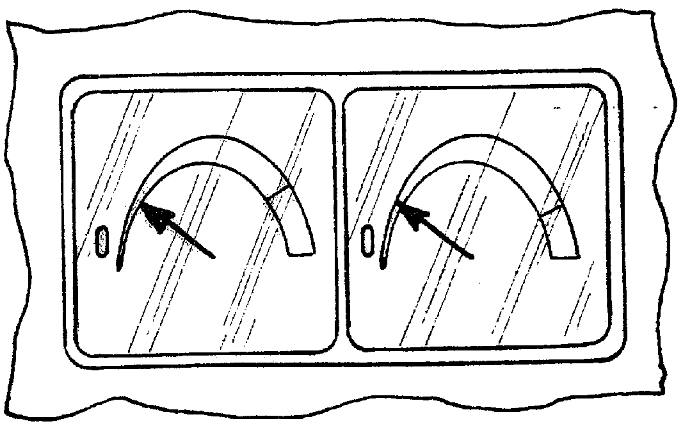

As a result, the present invention permits eliminating or minimizing the risks of loss from the use of a sealing means, such as an O-ring, permits overcoming moreover the problems of compatibility of materials, permits a reduction in size and weight of the manometer/expander assembly, permits the use a manometer or manometers in a protection space that does not permit screwing in of a conventional manometer, gives rise to a saving of time for mounting and unmounting manometers on the expander body and permits designing manometers having shapes which are no longer necessarily of revolution, for example expanders of square shape or rectangular shapes without thereby encountering problems of indexing these latter. Such manometers are shown in FIG. 8.

Figure 9A:
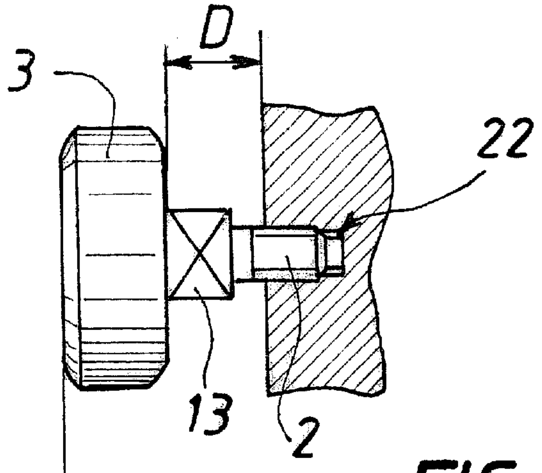
Figure 9B:
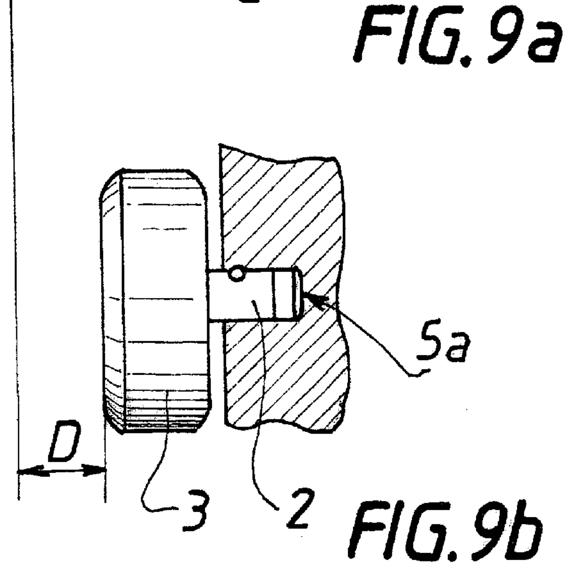

FIG. 9 itself permits indicating the distance D saved when a manometer 3 according to the present invention is used (FIG. 9*b*), relative to a manometer according to the prior art comprising a connection ferrule 2 provided, on the one hand, with a gripping member 13 and, on the other hand, a deformable ring ensuring sealing. It will immediately be understood that the manometer according to the present invention permits increasing substantially the mechanical efficiency of the manometer itself and of the manometer/expander assembly.

Figure 10:
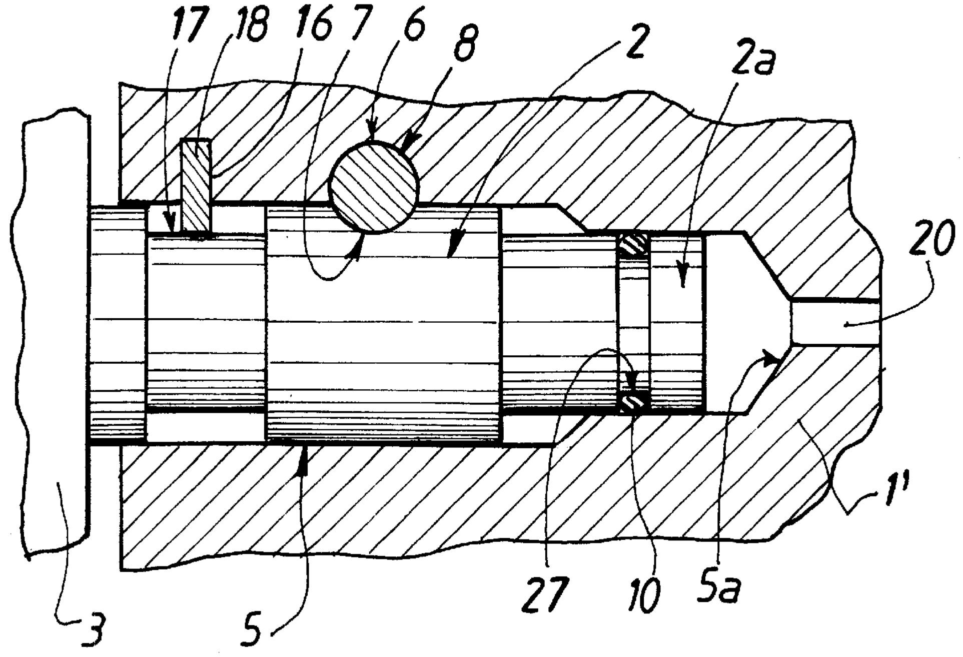

FIG. 10 shows another embodiment according to the invention, in which the connection ferrule 2 of the manometer 3 is inserted in the recess of the body 1' of an expander, being maintained secured to said body 1' by the coaction of a key 8 inserted in a passage 6 of the body 1' and a recess 7 provided in the side peripheral wall of the connection ferrule 2.

However, in this embodiment, the body 1' also comprises a second passage 16 and the connection ferrule 2 also comprises a second recess 17, in which passage 16 and recess 17 is inserted a second securement means 18, such as a second key 18, forming a backup obstacle preventing ejection or untimely retraction of the manometer 3 from its recess 5 of the expander, in case of accidental or untimely retraction of the securement means 8 from the recess 7 and/or from the passage 6.

In other words, the presence of the second securement means coacts with the second passage 16 of the body 1' and with the second recess 17 of the ferrule 2 to permit an increase in safety of use for the operator. Moreover, as in the preceding embodiments, the manometer 3 is supplied with gas under pressure by the passage 20 for gas supply under pressure disposed in the body 1' of the expander and opening at the lower end of the recess 5.

Moreover, an O-ring 10 arranged below the distal end 2*a* of the securement ferrule 2 permits ensuring sealing; the torque joint being inserted in a circular throat 27 peripheral to the end 2*a* of the ferrule 2.

In case of breakage of the key 8 or of untimely disassembly of the manometer/expander assembly by withdrawal of said key 8 inserted in the passage 6 and the recess 7, the presence of the second securement means 18 permits avoiding an expulsion of the manometer 3 which could be dangerous for the user, whilst permitting a loss of gas under pressure supplied by the conduit 20, said loss becoming an alert detectable by said user, warning him of the risk in case disassembly of said manometer 3 is continued.

Figure 11:
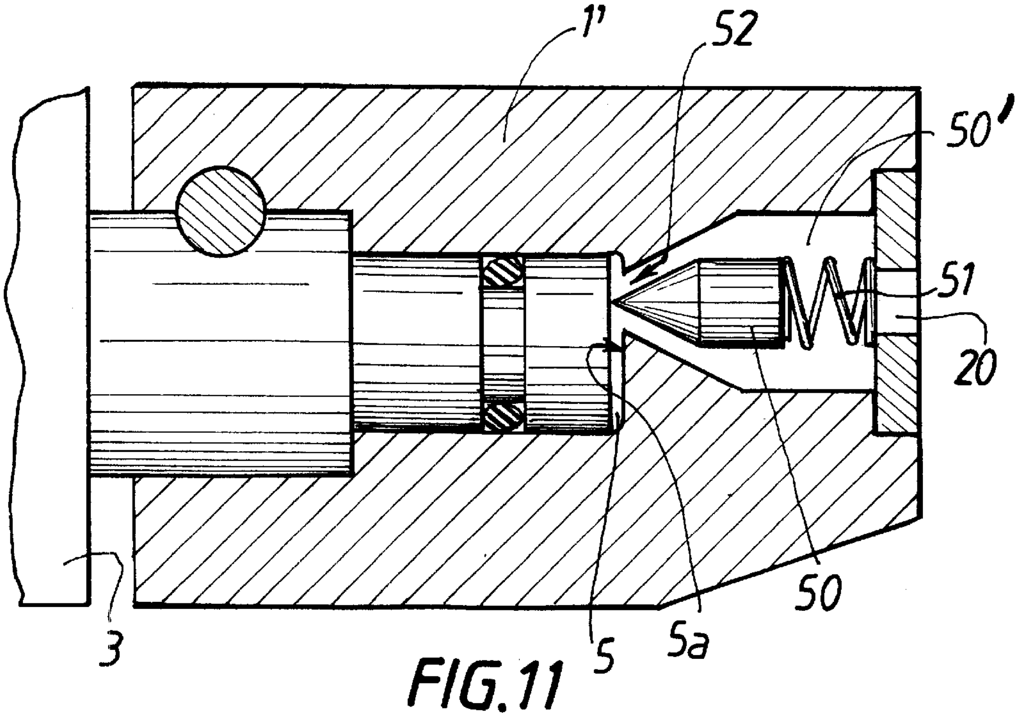

FIG. 11 is similar to FIG. 6 except that it comprises moreover a recess 50' provided in the body 1', located between the passage 20 for supply of fluid under pressure and the bottom of the recess 5, which supplemental recess 50' comprises a device preventing loss of gas upon disassembly and/or disassembly of the manometer 3 from the body 1'.

According to this embodiment, this safety device comprises valve means 50 urged by resilient means 51, such as a spring or the like, said valve means 50 closing at least partially the opening 52 separating the recess 5 and the supplemental recess 50', during the assembly or disassembly of the manometer 3 on or from the body 1', so as to control the passage of the gas or fluid under pressure from the supplemental recess 50' and toward the manometer 3.

Figure 12:
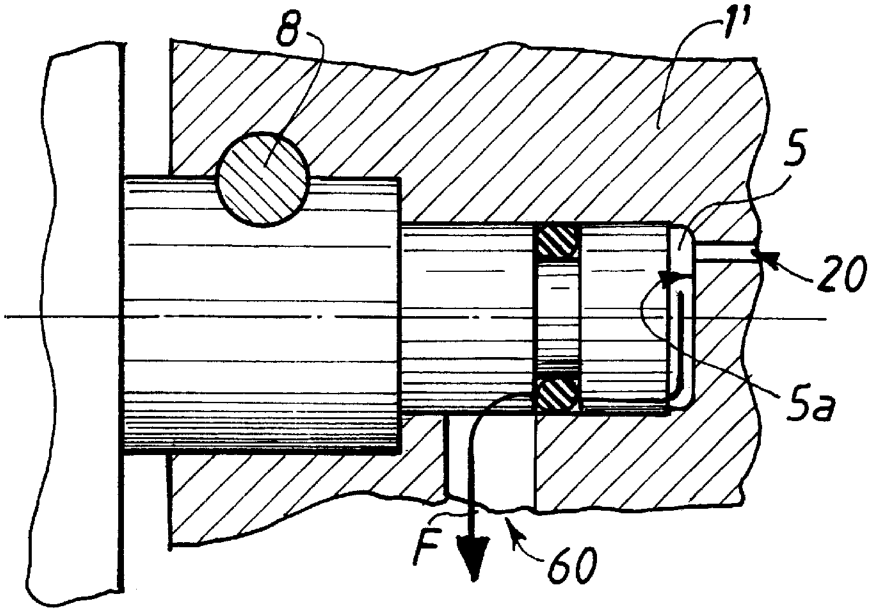

FIG. 12 is itself analogous to FIG. 6, except for the fact that, in this embodiment, a supplemental piercing 60 has been provided in the body 1', so as to permit the gas pressure or fluid pressure to escape to the atmosphere upon disassembly of the manometer whilst the latter is always under pressure or that a residual pressure still exists in the recess 5 The fluid under pressure susceptible to being disposed in the recess 5 and/or supplied by the supply passage 20, is then evacuated to the atmosphere as shown by the arrow F.

Figure 13:
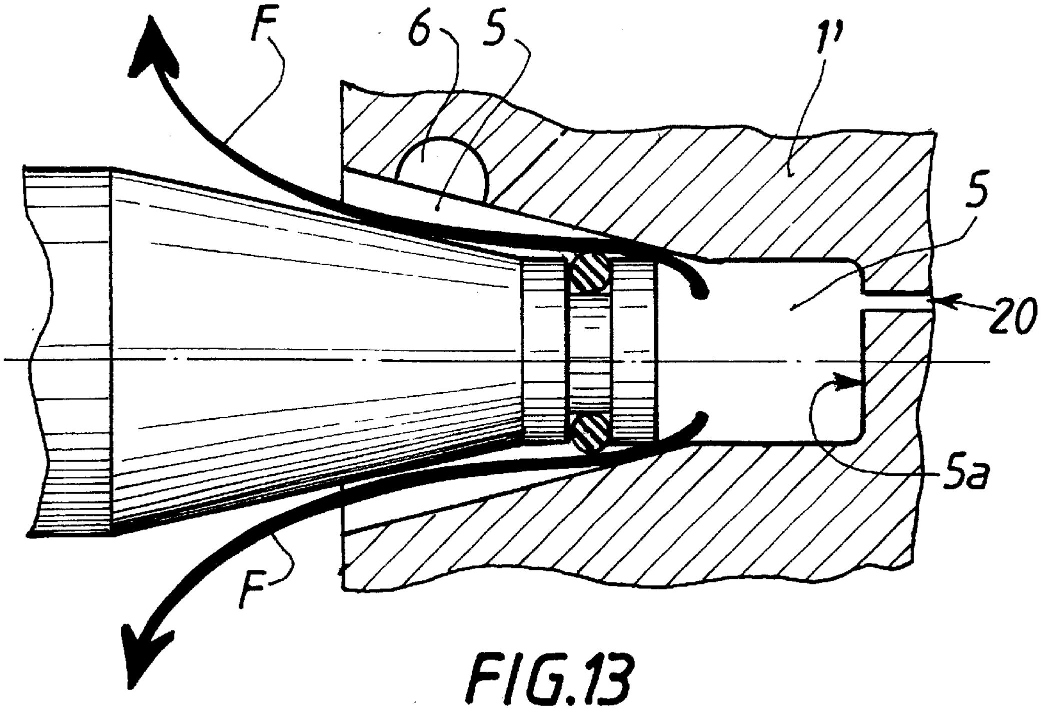

FIG. 13 shows another mode of securement, analogous to that of FIG. 12, in which the recess 5 has a flared shape, which is to say in the shape of a funnel, adapted to permit, here again, the fluid under pressure to escape to the atmosphere, in the case of disassembly of the manometer whilst a residual pressure exists in the recess 5, or that this recess 5 is continuously supplied with gas or fluid under pressure by the supply passage 20 for supply fluid. The escape of gases to the atmosphere is, again, shown by the arrows F.

The fluid distribution device according to the present invention, particularly an expander, and the manometer according to the present invention, can be used in all fields requiring the use of a distribution of fluid under pressure, in particular in the field of welding or the medical field.

What is claimed is:

1. A distribution device for fluid under pressure, comprising:

at least one body provided with at least one manometer comprising a housing and a connection ferrule;

said connection ferrule being inserted in a body recess provided in the body;

said body having at least one passage communicating with said body recess;

said connection ferrule comprising at least one recess and one sealing means;

said sealing means being arranged between said at least one recess and a distal end of the connection ferrule;

said sealing means being inserted in a circular peripheral throat provided in a peripheral side wall of the connection ferrule; and at least one connection means for insertion in at least one portion of said at least one passage of the body and into at least one portion of said at least one recess of the connection ferrule, so as to permit securement, at least temporarily, of said manometer on said body.

2. The device according to claim 1, wherein said at least one recess is carried by a peripheral side wall of the connection ferrule.

3. The device according to claim 1, wherein the connection ferrule comprises several recesses, and the body comprises several passages communicating laterally with said body recess; and said at least one connection means being inserted in at least one portion of at least one of said passages and into at least one or a portion of at least one of said recesses.

4. The device according to claim 1, wherein the connection means is of elongated shape and selected from among keys, pins, rods, screws and cotters.

5. The device according to claim 1, wherein the connection ferrule has a peripheral side wall, which is free from screw threading, and the body recess has a peripheral wall which is free from tapping.

6. The device according to claim 1, further comprising at least one supply passage, which opens through an opening in the bottom of the body recess, for supplying fluid under pressure.

7. The device according to claim 6, wherein at least one supplemental recess, comprising control means of the circulation of the fluid under pressure entering the body recess through the opening, is provided in the body between the bottom of said body recess and the supply passage.

8. The device according to claim 1, wherein said device is selected from expanders for fluid under pressure, and valve/expander assemblies for gas under pressure.

9. A cylinder for a welding gas or medical gas under pressure, comprising a distribution device according to claim 1 for distribution said gas under pressure.

10. A manometer for use with a distribution device for distributing fluid under pressure, the manometer comprising a housing and a connection ferrule; said connection ferrule comprising at least one recess provided in its peripheral side wall, and at least one peripheral circular throat adapted to receive a sealing means; said peripheral circular throat being arranged between said at least one recess and a distal end of the ferrule.

11. A distribution device for fluid under pressure, comprising:

at least one body provided with at least one manometer comprising a housing and a connection ferrule;

said connection ferrule being inserted in a body recess provided in the body;

said body having at least one passage communicating with said body recess;

at least one supplemental passage, which opens through a side wall of the body recess, for causing the body recess to communicate with the atmosphere;

said connection ferrule comprising at least one recess; and at least one connection means for insertion in at least one portion of said at least one passage of the body and into at least one portion of said at least one recess of the connection ferrule, so as to permit securement, at least temporarily, of said manometer on said body.

* * * * *